US009788478B2

(12) United States Patent
Overmöhle

(10) Patent No.: US 9,788,478 B2
(45) Date of Patent: Oct. 17, 2017

(54) INSERTION APPARATUS FOR MULTILAYER FERTILIZATION

(71) Applicant: Hugo Vogelsang Maschinenbau GmbH, Essen (DE)

(72) Inventor: Gerd-Felix Overmöhle, Quakenbrück (DE)

(73) Assignee: Hugo Vogelsang Maschinenbau GmbH, Essen (DE)

( * ) Notice: Subject to any disclaimer, the term of this patent is extended or adjusted under 35 U.S.C. 154(b) by 0 days.

(21) Appl. No.: 14/626,517

(22) Filed: Feb. 19, 2015

(65) Prior Publication Data

US 2016/0183449 A1 Jun. 30, 2016

(30) Foreign Application Priority Data

Feb. 20, 2014 (DE) .................... 20 2014 001 511 U

(51) Int. Cl.
*A01C 23/02* (2006.01)
*A01C 21/00* (2006.01)
(52) U.S. Cl.
CPC .......... *A01C 21/002* (2013.01); *A01C 23/022* (2013.01)
(58) Field of Classification Search
CPC ..... A01C 23/022; A01C 23/021; A01C 23/02; A01C 23/00; A01C 21/002; A01C 21/00
See application file for complete search history.

(56) References Cited

U.S. PATENT DOCUMENTS

| 6,827,565 | B1 | 12/2004 | Vogelsang |
| 6,997,121 | B2 | 2/2006 | Buchholtz |
| 8,789,778 | B2 | 7/2014 | Abeln |
| 8,807,451 | B2 | 8/2014 | Huntelmann et al. |
| 8,944,779 | B2 | 2/2015 | Krampe et al. |
| 9,127,673 | B2 | 9/2015 | Krampe |
| 2012/0032003 | A1 | 2/2012 | McMahon et al. |
| 2013/0236348 | A1 | 9/2013 | Vogelsang et al. |
| 2014/0339054 | A1 | 11/2014 | Vogelsang |

FOREIGN PATENT DOCUMENTS

| DE | 69212247 T2 | 12/1992 |
| FR | 1454990 A | 10/1966 |
| FR | 2045320 A5 | 2/1971 |
| NL | 1037498 C | 5/2011 |

OTHER PUBLICATIONS

German Patent Application No. DE202014001511.2, Search Report dated Oct. 28, 2014.
Europe Patent Application No. 15155738.6, Search Report (and English translation) dated Jul. 7, 2015.

*Primary Examiner* — Christopher J Novosad
(74) *Attorney, Agent, or Firm* — Kilpatrick Townsend & Stockton LLP; Dean W. Russell; Renae Bailey Wainwright

(57) ABSTRACT

Apparatus for inserting a solid manure storage into a soil layer, the apparatus including sets of first and second discharge openings which are spaced vertically from each other. The apparatus also includes a distributor and first and second sets of exit openings for distributing the solid manure storage from the distributor into the first and second discharge openings via first and second connecting lines.

15 Claims, 5 Drawing Sheets

INSERTION APPARATUS FOR MULTILAYER FERTILIZATION

CROSS-REFERENCE TO RELATED APPLICATION

This application claims priority to German Patent Application No. 202014001511.2 filed on Feb. 20, 2014, the contents of which are incorporated herein by reference.

BACKGROUND OF THE INVENTION

The invention relates to an apparatus for inserting a solid manure storage into a soil layer.

This type of apparatus is used in agricultural production to spread solid manure on an area for crop plant cultivation. It is generally known to spray said solid manure by means of a distributor apparatus above the soil surface thus covering the cultivation area with solid manure. This solid manure then partly seeps into the ground, i.e. its liquid content, and remains partly as top layer on the ground. Said method and apparatus for implementing said method make it possible to spread solid manure on the crop plant cultivation area in an economically feasible manner, in particular because the solid manure is dispensed from a tank through a relatively large opening and then spread by means of a centrifugal disc, centrifugal distributor or the like with a low risk of blockage, and the superficial spreading and subsequent percolation allow for a relatively favorable arrangement of the solid manure near the surface. However, said type of spreading has the disadvantage of significant odor and ammonia emissions. This type of odor emission is regulated differently according to national or supranational regulations and requirements. These regulations range from requirements regarding emission limits to requirements that only allow this type of manure spreading in connection with subsequent soil preparation for inserting the manure layer into the soil by subsequently turning the soil within a predetermined maximum period of time after spreading the manure.

Generally, spreading the manure by distributing it above the cultivation surface and subsequent insertion helps to achieve low-odor and low-ammonia insertion of solid manure into the soil. However, this procedure has the disadvantage that it is necessary to work the soil twice and to travel over the soil twice accordingly, which requires additional working time as well as additional fuel and material. In addition, it has proved a disadvantage that inserting the manure in a second step causes significant corrosion of the soil cultivation equipment due to high chemical aggressiveness.

Besides said established spreading procedures for solid manure it is meanwhile also known to insert solid manure into a soil cultivation area not by spraying it above the surface but is directly inserted into the soil to a predetermined depth. With this procedure, the outlet opening is arranged at a lower end of a soil prong which is inserted into the soil to a predetermined depth. Typically, with this procedure, the manure is spread via several such openings on accordingly several tines, which are arranged adjacently to each other with regard to a driving direction and are dragged through the soil in driving direction during soil preparation. This creates several parallel and laterally spaced manure storages in the form of several strands of solid manure which are located at a specific depth of the soil.

The advantage of this type of manure insertion is that it is almost free of emissions and thus the solid must not be worked subsequently for emission protection reasons. The disadvantage of this type of insertion is, however, the locally very limited arrangement of solid manure which, with regard to the fertilizing effect of the manure, causes a disadvantageous distribution on the soil surface and thus does not ideally support the growth of the crop plants. In particular, this type of insertion leaves a large part of the soil layer low in nutrients, while a locally very limited part of the soil is left with a too high concentration of nutrients. This is desired in some, but not in all cases. For this reason, in part for the purpose of a more favorable distribution of nutrients from the solid manure, the soil is nevertheless worked subsequently, which, however, has the above mentioned disadvantages.

Another problem of the direct insertion of the manure through several discharge openings that are inserted into the soil is the specific composition of the solid manure. While it is comparatively easy to feed such solid manure from a tank through a large discharge opening and to spray it by means of a centrifugal disk or a centrifugal distributor above the surface, spreading through several small openings is problematic, since these openings can become blocked. Since it is not possible to intensively process and homogenize the solid manure for economic reasons, it has to be dealt with the fact that during spreading, the solid manure may contain solid parts of different sizes and composition, ranging from fine fiber components to large fiber lumps, branches or pieces of branches or mineral solids of different sizes. The spreading of such solid manure from a tank is a regular problem if during the spreading, the solid manure is to be distributed from a large passage cross section to several small passage cross sections. Scientific information indicates that a finer distribution of the solid manure in the form of individual strands that are laterally spaced from each other, makes the insertion into and distribution of nutrients over the cultivation area economically advantageous. From a practical point of view, such insertion of solid manure is, however, often not reliable, since the inadequate distribution regularly leads to blockages which in turn lead to an unreasonable maintenance effort and in addition—since such local blockages cannot be identified during the spreading procedure—to an unreliable spreading.

BRIEF SUMMARY OF THE INVENTION

The invention is based on the task of providing an apparatus and a method for spreading solid manure which ensures a low-emission insertion of solid manure with a more favorable distribution of nutrients than previously known spreading procedures, without thereby impairing the efficiency of the discharge procedure.

This task is solved by an apparatus of the type described above comprising the following construction elements: an insertion apparatus with a set of first discharge openings and a set of second discharge openings which are spaced vertically from the first discharge openings in the operating position of the insertion apparatus, a distributor comprising a distributor interior, an intake opening that opens into the distributor interior for feeding solid manure, a first set of several first exit openings for diverting the solid manure from the distributor space, and a second set of several second exit openings for diverting the solid manure from the distributor space, a first set of several first connecting lines, whereby each first connecting line extends from a beginning of the line to an end of the line, is connected at its beginning to a first exit opening and at its end to a first discharge opening from the set of first discharge openings, a second set of several second connecting lines, whereby each second connecting line extends from a beginning of the line to an end of the line, is connected at its beginning to a second exit opening and at its end to a second discharge opening.

The insertion apparatus according to the invention makes it possible to insert solid manure into a cultivation area at least two vertically spaced heights in an economical and reliable manner. This is achieved by distributing the solid manure in a distributor across a first set of respectively several exit openings from the distributor interior, and by connecting each of these exit openings to a respective connecting line for conveying the solid manure. The first set of exit openings is accordingly in fluid contact with several first connecting lines with a plurality of first discharge openings. Said first set of discharge openings places the solid manure directly from the distributor interior at a first, predetermined depth of the soil without another branching or cross-section constriction being required, and can be applied as a plurality of parallel strands at this depth. A second set of exit openings, connecting lines and second discharge openings then insert the solid manure into the soil to a second predetermined depth which is vertically spaced to the first depth. Here also, the solid manure is inserted into the soil as a plurality of parallel, laterally spaced strands and can, for example, be inserted at a second depth, which is above the first depth.

The invention thus achieves placement of a plurality of respectively two vertically spaced strands of solid manure and prevents the unfavorable, high local concentration that is associated with the previously known type of solid manure spreading and the requirement to work the area subsequently for a second time to achieve a favorable and low-emission distribution over the soil surface. Said favorable distribution is achieved without branches or cross-section reductions being required during the transit of the solid manure from the distributor to the discharge openings, and is therefore low-maintenance and resistant to blockages.

According to a first preferred embodiment, it is provided that the first exit openings have a larger cross section than the second exit openings. This embodiment provides for a difference in cross section size between the first and the second exit openings of the distributor. The cross section size is the size of the cross section through which the solid manure flows when it passes through the exit opening. Due to the higher or lower throttling effect, which depends on the cross section size, the cross section size of the exit opening thus determines the size of the volume flow through the exit opening. In general, it is to be understood that, on the basis of the exit opening, also the cross section size of all fluid carrying components below, such as the connecting piece for the connecting line, the connecting line and the discharge opening should match the cross section size of the exit opening. In principle, larger cross section sizes in one or several of these components can be provided behind the exit opening. Preferably however, the cross section size of the following components is not smaller than the cross section size of the exit opening.

By providing different cross section sizes of the first exit opening compared to the second exit opening it is possible to spread a different amount of solid manure through the first discharge opening than through the second discharge opening. This is in particular preferable in order to, for example, insert a thicker strand of solid manure through the first exit openings up to a lower soil level and a smaller strand of solid manure up to a soil layer that is close to the surface. This distribution causes a quick provision of nutrients for the planted seedling or plant seeds and a provision of a larger amount of nutrients after a period of time in which the seedling's roots have already grown in the depth where they reach the nutrient depot at the lower level.

The apparatus according to the invention can also be designed by a third set of several third exit openings for discharging the solid manure from the distributor space and a third set of several third connecting lines, whereby each third connecting line extends from one beginning of the line to an end of the line, is connected at its beginning to a third exit opening and at the end to a first discharge opening from a set of the first discharge openings. This embodiment provides a total of three sets of exit openings from the distributor interior. The exit openings of the second set with accordingly second connecting lines are connected to the set of second exit openings in a 1:1 assignment so that each outlet opening is connected directly to respectively one discharge opening via a connecting line. The exit openings of the first and third set are also connected to a connecting line of a first and third set so that there is a 1:1 assignment of each exit opening to a connecting line. The end of the line of both the first connecting line which extends from a first exit opening as well as the third connecting line extending from a third exit opening is connected to a single first discharge opening so that here a single first discharge opening is supplied with solid manure from respectively a first and a third exit opening. This ensures that each first discharge opening is supplied with a larger volume flow of solid manure than the second discharge openings.

It is furthermore particularly preferred that the first, second and, if applicable, third exit openings have the same cross section size. With this embodiment, all exit openings of the distributor have the same cross section size. This type of construction enables an advantageous production since the dimensions of these exit openings are identical in design. In addition, the distributor can be used universally, since manure storages can be positioned at different depths out of the exit openings in the manner according to the invention, but the distributor can also be used to lay rows of three or more vertically arranged manure storages or a large amount of horizontally spaced manure storages by connecting the connections to the exit openings by means of respective connecting lines to respectively several discharge openings. This modified manner of use ensures that each exit opening is supplied with the same volume flow. In the same manner it is possible for the distributor to spread the manure storages at a single level, which in turn provides for an increased working width due to the then larger amount of discharge openings at the single level or a shorter distance between the spread strands with an equal working width.

According to another preferred embodiment it is provided that the first and second exit openings have an equal cross section size and the first and third exit openings have different cross section sizes. With this embodiment, an additional volume flow to the first discharge openings is provided through the third exit openings, which does not represent a mere doubling of the volume flow compared to the one through the second discharge openings. Instead, the volume flow can be chosen to be more than twice as large by making the third exit openings larger than the first and second exit openings or less than twice as large by making the third exit openings smaller than the first and second exit openings.

Alternatively, it can be provided that the first and second exit openings have an equal cross section size and the first and third exit openings have different cross section sizes. This embodiment makes it possible that the first discharge openings are supplied with solid manure through two first and third exit openings of matching size and the second discharge opening is supplied through a second exit opening, the size of which is different from the cross section size of this first and third exit opening, i.e. larger or smaller.

Preferably, each exit opening is fluidly connected to respectively a connecting piece so as to attach the respective connecting line hereto and feed the solid manure from the exit opening via the connecting piece to the connecting line. The connecting pieces can preferably have a passage cross section which has the same size as the passage cross section area of the respective exit opening. Preferably it can also be provided that the connecting pieces of all exit openings have matching connection dimensions for the connecting lines, i.e. according to the embodiment, for example the same outer diameter to ensure the use of matching connecting lines for all two or three sets of connecting lines. This can be designed in a way that the connecting pieces have matching inner diameters and thus inner passage cross section areas, whereby these are preferably larger than or equal to the largest passage cross section of the first, second and third exit openings.

Furthermore it is preferably provided that a cutting apparatus is positioned in the distributor interior which is movable relative to the first and second exit openings. By providing said cutting apparatus in the distributor interior the solids in the manure can be cut so as to reduce the risk of or prevent blockage of the openings or lines in flow direction behind the distributor. In addition, said cutting apparatus can cause a circulation or mixing in the distributor interior by designing the cutting apparatus as cutting/mixing apparatus. Said circulation or mixing in the distributor interior can help to dissolve blockages that are forming and thus maintain the passage through all openings and lines.

The cutting apparatus can further be designed to cover a part of the exit openings and separate it from the supply of solid manure and connect another part of the exit openings to the supply of solid manure from the distributor interior and move it in such a way that all exit openings are intermittently covered and released by the movement or at least a part of the exit openings is intermittently covered and released and another part is permanently released. The cutting apparatus intermittently covers and releases the exit openings, which achieves a pressure pulse supply of the exit openings and all following fluid carrying components with solid manure which favorably prevents blockages. Also, the supply pressure from the distributor interior is favorably released only for a reduced number of exit openings thus further reducing the risk of blockage.

Here, it is particularly preferred if the cutting apparatus strokes across the edge of at least some, preferably all first, second and/or third exit openings. With this embodiment, the cutting apparatus and the exit openings or a part of the exit openings of the first, second and/or third set together have a shearing cutting effect. For this, the exit openings can be completely or partly arranged on a cutting plate, which can, for example, be an even or bent cutting plate. The edges of the exit openings on this plate thereby form a cutting edge and the cutting apparatus with its cutting edge moves relatively to the cutting edge at the exit opening. This causes a shearing effect with respect to the solids that enter into the exit opening and achieves an efficient cutting of the solids as they enter the exit openings. Here it is particularly preferred if the cutting edge strokes across all first, second and, if applicable, third exit openings so that this shearing effect and cutting of the solids occurs at all exit openings thus preventing blockage of all lines and discharge openings.

Further, it is preferred that the cutting apparatus has several cutting edges out of which respectively each strokes across at least a number of first, second and/or, if applicable, third openings. Said embodiment of a cutting apparatus with several cutting edges can stroke across all first, second and, if applicable, third openings or a number thereof with its cutting edges with a higher frequency so as to achieve a higher cutting performance. At the same time, the wear of the cutting edges is reduced by distributing the cutting effect across several cutting edges. The cutting edges can be straight or curved. The cutting apparatus can further comprise a pre-tension apparatus which presses the cutting edges with an elastic pre-tension force against the cutting plate which has the first, second, and, if applicable third exit openings, and the cutting edges must be readjusted if they are worn.

Further, it is preferably provided that the cutting apparatus can pivot around a rotation axis and is set into rotary or swinging motion by means of a drive mechanism. Said embodiment of the cutting apparatus as rotating cutting knife with one or several cutting edges that are moved relative to the exit openings on an even or curved plate, for example the inner wall of a plate designed as a tube, allows for a robust drive design and at the same time a simple maintenance of the cutting apparatus. The driving mechanism can for example be an electric or hydraulic engine. Similarly, the cutting apparatus as driving mechanism can have a coupling shaft which can be coupled to a respective connecting apparatus with an external actuator, for example the power take-off shaft of a hauler.

In particular, it is further preferred that the first, second and, if applicable, third openings are arranged in an even cutting plate. The embodiment of the distributor apparatus with an even cutting plate which has the first, second and, if applicable, third openings makes it possible to provide a cutting apparatus whose cutting edge or cutting edges can be moved on this even cutting plate in a rotating motion. Here, the exit openings can be connected to a respectively axially extending connecting piece, which, for example, extends axially and radially outwards so as to allow for an easy connection of the connecting lines. Said design of the distributor apparatus makes it possible to insert the injection openings on one side axially into the distributor interior and to drive a cutting knife rotor and provide on the opposite side the connections for the connecting lines from the first, second and, if applicable, third outlet openings.

According to another preferred embodiment, it is provided that the passage cross section of a fluid carrying path extending from one or each exit opening to a discharge opening does not decrease. This design reliably prevents blocking due to solids that remain when the solid manure passes through from the exit opening of the first, second and/or third set to the discharge opening. In particular, preferably the cross section of the fluid line extending from the exit opening to the discharge opening can be kept constant or can expand section by section or as a whole.

Finally, it is provided according to another preferred embodiment that the first and second discharge openings are arranged on a hollow cultivator tine, which has a hollow space in the inside which joins the first and, if applicable, third connecting line and is in fluid contact with the second discharge opening. With this embodiment, the first and second discharge opening can be arranged at a specifically defined height by inserting the cultivator tine into the soil layer. The second output opening is then supplied with solid manure via a flow path leading through the cultivator tine. The cultivator tine can, for example, be a cylindrical pipe, a pipe with an elliptical cross-section or the like. The first discharge opening can also be arranged integrally in the cultivator tine and be supplied with solid manure via a respective flow path, which is preferably separated from the flow path to the second discharge opening. In this case, two connections are provided on the cultivator tine and, if applicable, three connections for the respective connecting lines to the first and second discharge opening. Similarly, the first discharge opening can be merely directly or indirectly connected to the cultivator tine, for example by means of a respective connecting piece that is attached to the cultivator tine and which itself is in fluid contact with the connecting line.

Another aspect of the invention is a distributor apparatus for distributing solid manure over a plurality of discharge openings comprising an distributor interior, an intake opening leading into the distributor interior for the supply of solid manure, a first set of several first exit openings for diverting the solid manure from the distributor interior, and a second set of several second exit openings for diverting the solid manure from the distributor interior, a first set of several first connecting pieces, whereby each first connecting piece is in fluid communication with one of the first exit openings and is designed for a connection to a first connecting line, a second set of several second connecting pieces, whereby each second connecting piece is in fluid communication with one of the second exit openings and is designed for a connection to a second connecting line. This distributor apparatus corresponds to the distributor apparatus described above in connection with the apparatus according to the invention for inserting a solid manure storage, and is suitable to distribute solid manure of this kind over several lines so that they can be inserted by a respective insertion apparatus at two vertically spaced levels into a soil layer.

Here, it is to be understood that the distributor apparatus can be designed according to the above further embodiments for the distributor apparatus of the insertion apparatus according to the invention; in particular the first and second exit openings can be designed according to the preferred embodiments described above; a set of third exit openings can be provided with respectively third connecting pieces, and a cutting apparatus with the above described design can be provided.

Finally, another aspect of the invention is a method for inserting solid manure into a soil layer comprising the following steps: inserting a plurality of first manure storages from a respective plurality of first discharge openings into a first layer that is away from the surface, inserting a plurality of second manure storages from a respective plurality of second discharge openings into a second layer that is close to the surface, feeding the solid manure to the first discharge openings via a plurality of first connecting lines, whereby the beginning of each first connecting line is in connection with respectively a first outlet opening of a respective plurality of first outlet openings and the end of each first connecting line is in connection with respectively one of the first outlet openings, feeding the solid manure to the second discharge openings via a plurality of second connecting lines, whereby the beginning of each second connecting line is in connection with respectively a second outlet opening of a respective plurality of second outlet openings and the end of each second connecting line is in connection with respectively one of the second outlet openings, introducing the solid manure into the distributor interior and distributing the solid manure from the distributor interior over the first and second outlet openings.

The method can be designed in a way that the solid manure is led from the intake opening via a distributor apparatus and connecting lines connected to this distributor apparatus and an insertion apparatus of the design explained above to the first and second discharge openings.

BRIEF DESCRIPTION OF THE DRAWINGS

Preferred embodiments of the invention are explained through the attached figures. The following is shown in.

DETAILED DESCRIPTION

Figure 1:
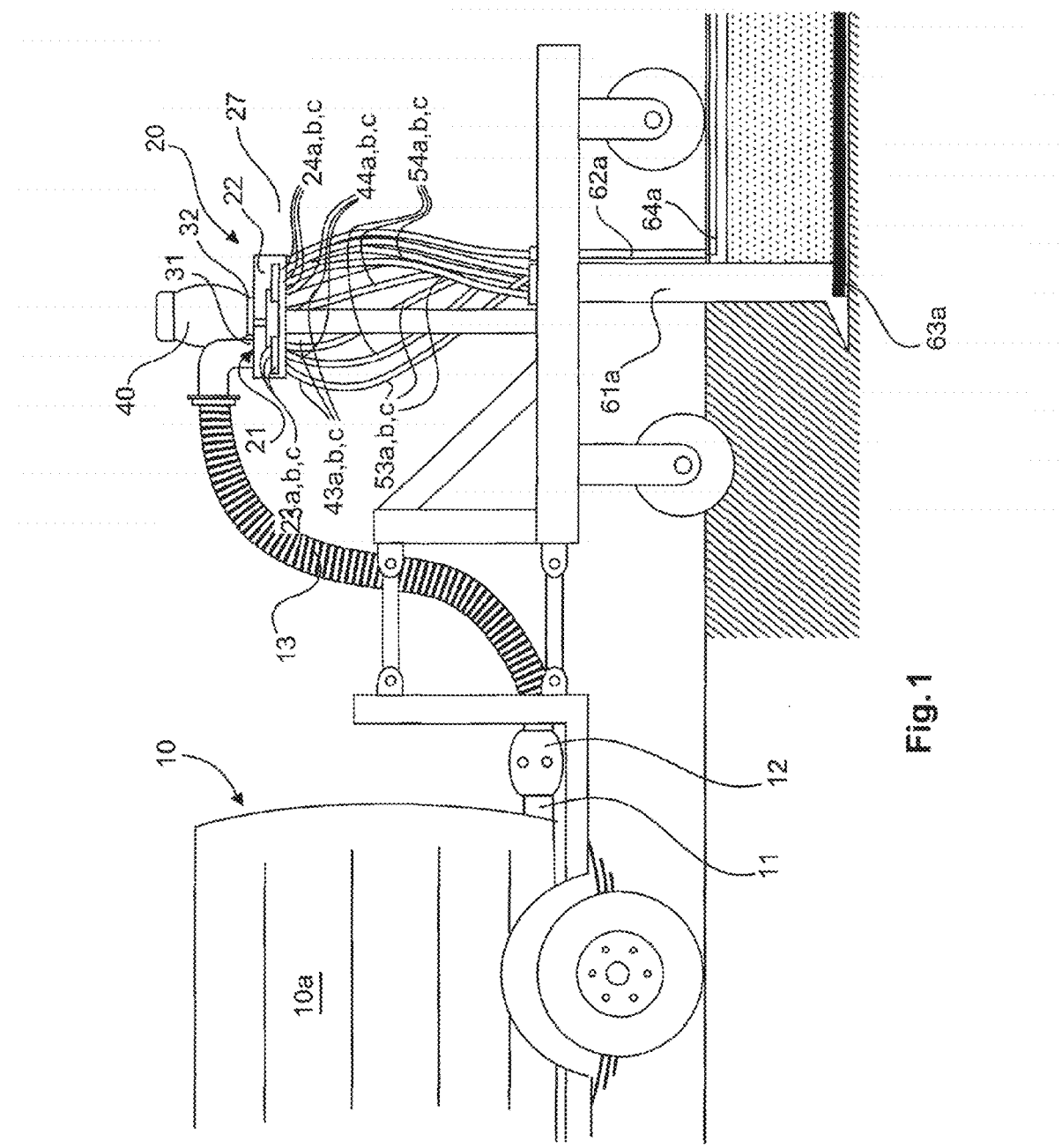
FIG. 1 is a schematic side view of an apparatus according to the invention for inserting a manure storage into a soil layer in an application on a cultivator coupled to a tanker.

Initially with regard to FIG. 1, tanker 10 is shown which, for example, can be towed by a tractor across a cultivation area in parallel lanes. Tanker 10 comprises tank 10a, which takes a supply of solid manure. The solid manure is led via a tank outlet 11 to a pump apparatus, such as a rotary piston pump 12 and led via said pump apparatus through supply tube 13 to a distributor apparatus 20 according to the invention. Supply tube 13 is connected to intake opening 21 of distributor apparatus 20 and leads the solid manure in distributor interior 22. Intake opening 21 leads on one side in axial direction to distributor interior 22.

On the opposite side, a plurality of outlet openings 23a, b, c, 24a, b, c are arranged. These outlet openings are arranged in alignment with connecting pieces 43a, b, c, 44a, b, c.

The outlet openings 23a, b, c, 24a, b, c are arranged in a cutting plate 27, which is arranged in the distributor interior on the axial front side that is opposite intake opening 21 and is fixed mounted.

Cutting knifes 31, 32 are attached to a knife carrier that is arranged in distributor interior 22 (not shown in FIG. 1) and are set into rotation by driving engine 40. Cutting knifes 31, 32 lie on the side facing to the interior of cutting plate 27 and thus stroke across outlet openings 23a, b, c, 24a, b, c. This leads to a shearing effect between cutting knifes 31, 32 and the edges of outlet openings 23a, b, c, 24a, b, c that are facing to the distributor interior.

A plurality of hose lines 53a, b, c, 54a, b, c are connected to connecting pieces 43a, b, c, 44a, b, c. These hose lines connect the distributor apparatus to a plurality of first discharge openings and a plurality of second discharge openings.

The side view according to FIG. 1 merely shows a first discharge opening 63a and a second discharge opening 64a. The other discharge openings are in row transversely to the driving direction of tanker 10 behind this first and second discharge opening 63a, 64a.

Connecting piece 23a is part of the first set of connecting pieces and discharge openings and is connected to the internal cavity of cultivator tine 61a by means of hose line 53a of the first set of hose lines. The solid manure flows from the first discharge opening 23a through connecting hose 53a to cultivator tine 61a and within the cultivator tine to discharge opening 63a which is arranged at the lower end of the cultivator tine.

Outlet opening 24a is connected to connecting hose 54a by means of connecting piece 44a. Connecting hose 54a is connected to insertion connecting piece 62a, which is aligned in driving direction behind cultivator tine 61a. Insertion connecting piece 62a extends to an upper soil layer and has a second discharge opening 64 at its lower end. This second discharge opening 64a is positioned at a higher level than the first discharge opening 63a.

As can be further seen, the second outlet opening 24a, the second outlet connection piece 44a, the second connecting hose 54a and the second discharge opening 64a have a smaller diameter than respectively the first outlet opening 23a, the first connecting piece 43a, the first connecting hose 53a and the second discharge opening 63a. The cross section size of the second outlet opening and the fluid carrying elements to the second discharge opening is therefore smaller than the cross section size of the first outlet opening.

FIG. 2 shows a first embodiment of a distributor apparatus according to the invention in a perspective view diagonally from above in a) and b) and a top view in c) and d). In all illustrations, the top housing cover is not shown for a better understanding of the functioning. In addition, in Figures a and c, no knife rotor is inserted into the distributor interior.

The distributor apparatus according to FIG. 2 has a distributor interior 122 which is limited laterally by pipe wall section 125. The distributor interior is limited upwards by a housing cover (not shown), which has an intake opening for the supply of the distributor interior with solid manure.

The distributor interior is limited downwards by cutting plate 120. The cutting plate has a large central opening 126 which has a knife flange 133 protruding through it. Knife flange 133 is coupled to drive engine 140 which is below cutting plate 120 and is set into rotation by this driving engine, which is shown as electronic motor as an exemplary embodiment. Driving engine 140 is outside the distributor interior.

The annular cutting plate 120 has a first set of a total of eight outlet openings 123a,b,c, which have a first diameter. These outlet openings 123a,b,c thus provide a first outlet cross section through which the solid manure passes from the distributor interior.

Furthermore, the cutting plate has a second set of a total of eight second outlet openings 124a,b,c, which have a second diameter. This second diameter is smaller than the first diameter, which means that the second outlet openings have a smaller outlet cross section than the first outlet openings.

The first and second outlet openings are evenly distributed over a circular path, which is concentrically positioned to the rotary axis of cutting knife flange 133 and respectively alternately arranged in such a way that a second outlet opening is respectively positioned between two first outlet openings and vice versa.

Each first outlet opening is in fluid contact with a first connecting piece 143a,b,c. The first connecting pieces extend from the underside of the distributor with a primarily axial alignment and incline slightly radially outward. The first mounting flanges 143a,b,c are designed as circular tube sections and have an inner diameter that corresponds to the diameter of the first outlet openings.

In the same way, the second outlet openings 124a,b,c are in fluid contact with the second connecting pieces 144a,b,c, which in turn extend axially-diagonally radially outward. The second connecting pieces 144a,b,c are also designed as circular tube sections and have an inner diameter that corresponds to the diameter of the second outlet openings.

The first and second connecting pieces 143a,b,c; 144a,b,c are attached to a lower housing plate 127. Cutting plate 120 rests on housing plate 127 and is non-rotatably mounted to it.

Figure 2B:
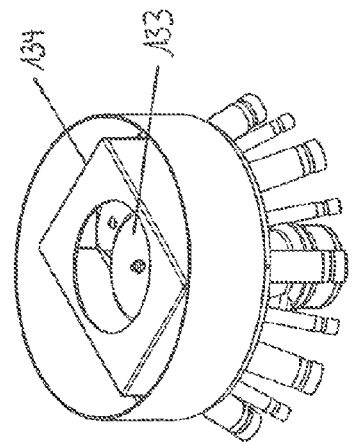
FIG. 2b is the view according to FIG. 2a with an inserted cutting rotor.
Figure 2D:
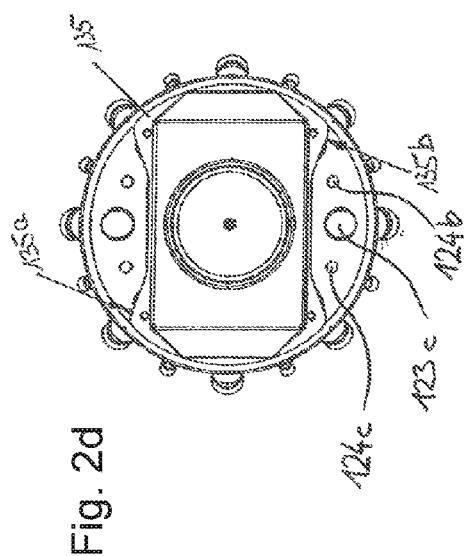
FIG. 2d: is a top view according to FIG. 2c with inserted cutting rotor.
Figure 2A:
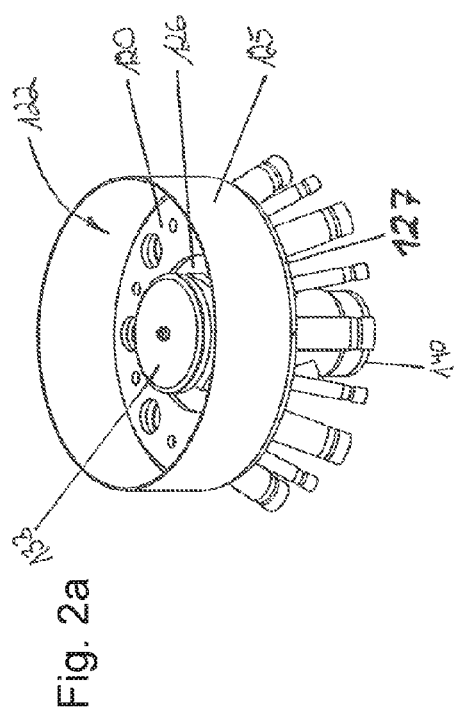
FIG. 2a is a schematic, perspective view diagonally from above of a distributor apparatus according to the invention without inserted cutting rotor in a first embodiment.
Figure 2C:
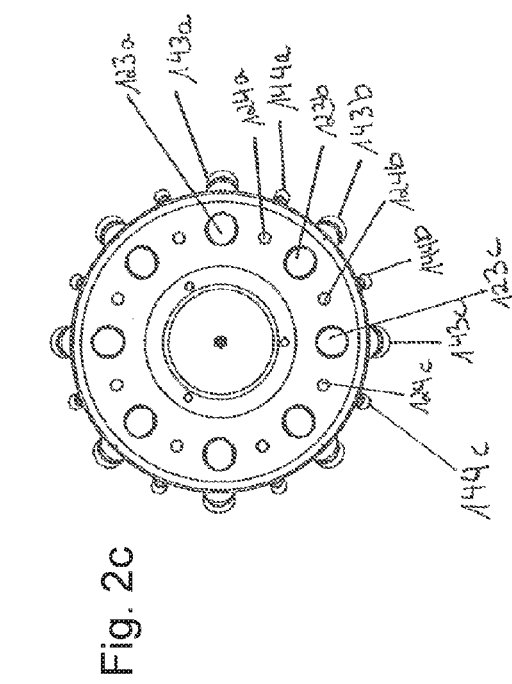
FIG. 2c is a top view of the embodiment according to FIGS. 2a and b without inserted cutting rotor.
Figure 3B:
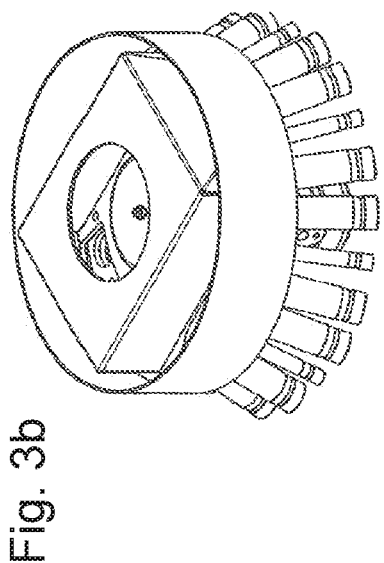
FIG. 3a-d: views according to FIGS. 2a-d of a second embodiment of a distributor according to the invention.
Figure 3D:
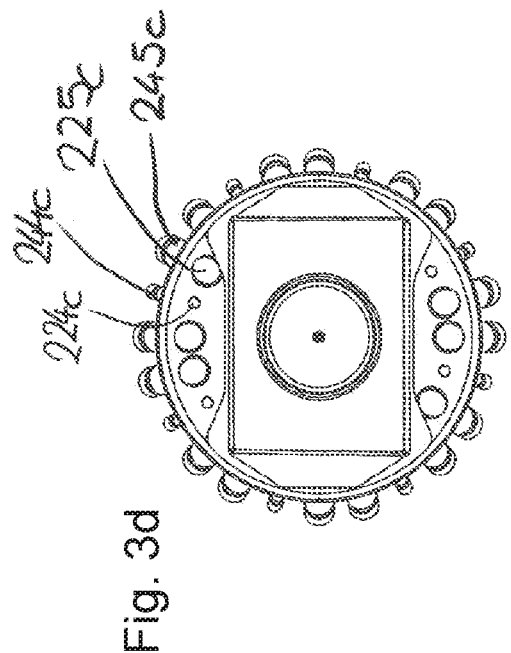
Figure 3A:
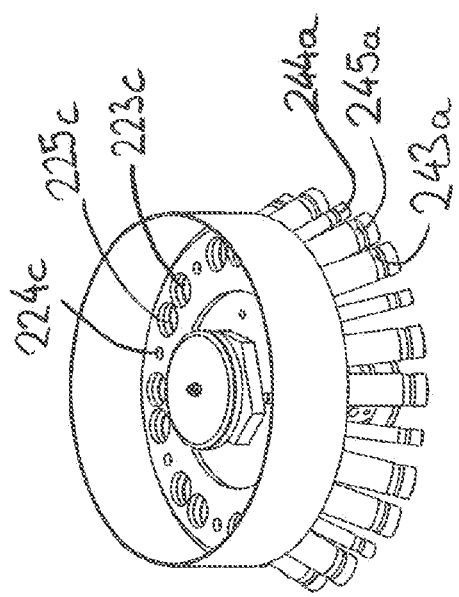
Figure 3C:
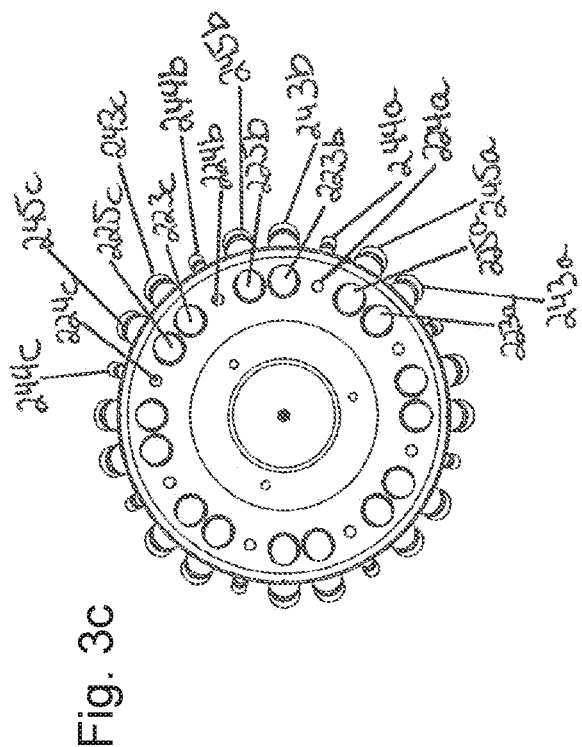
Figure 4B:
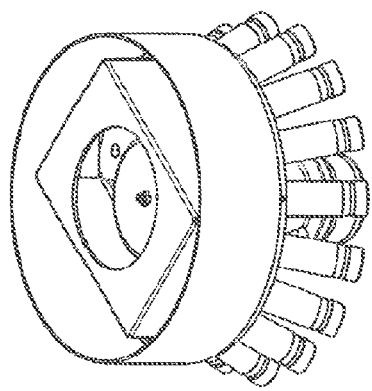
FIG. 4a-d: views according to FIGS. 2a-d of a third embodiment of a distributor according to the invention.
Figure 4D:
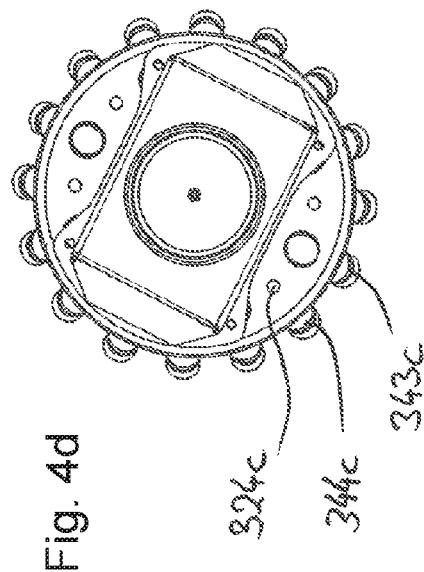
Figure 4A:
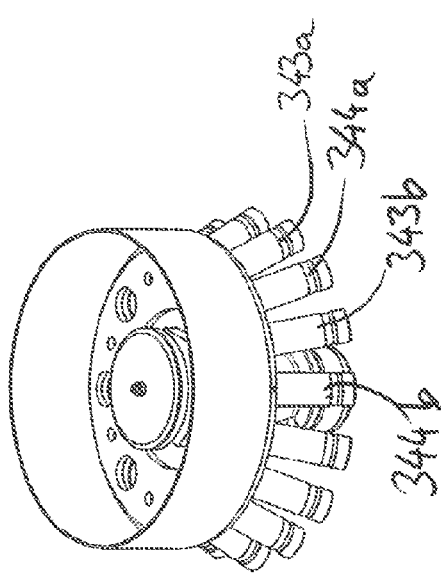
Figure 4C:
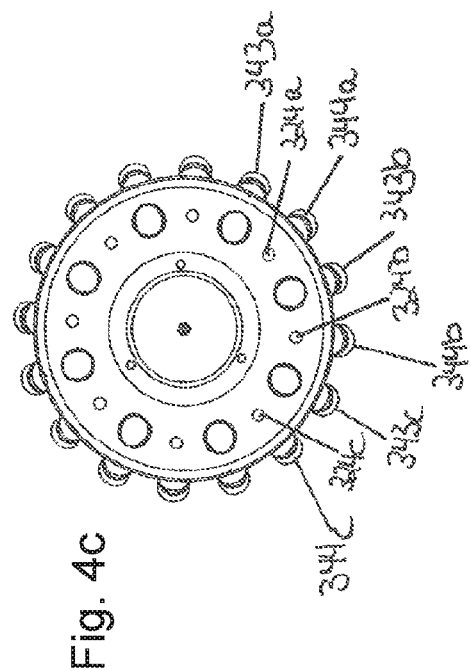
Figure 5B:
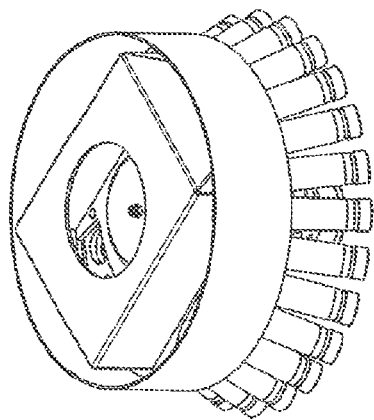
FIG. 5a-d: views according to FIGS. 2a-d of a fourth embodiment of a distributor according to the invention.
Figure 5D:
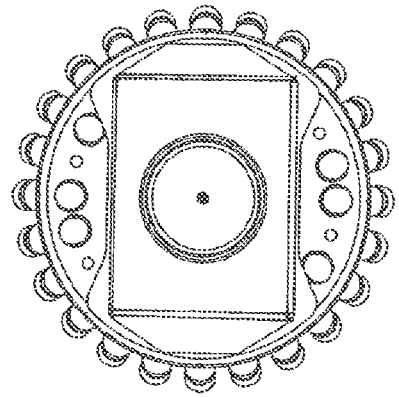
Figure 5A:
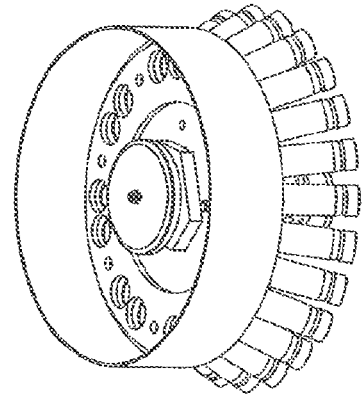
Figure 5C:
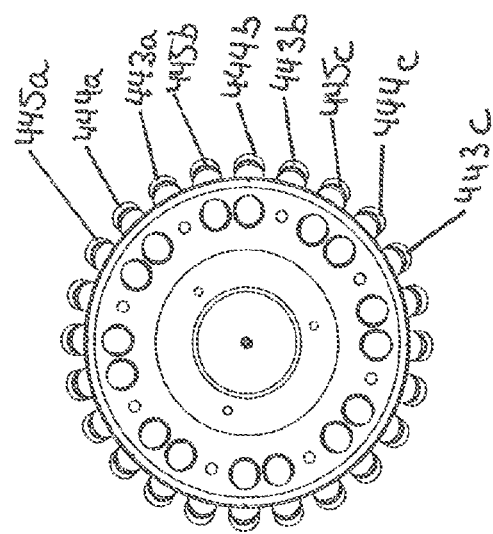

As can be seen in FIGS. 2b) and 2d), a cutting knife carrier 134, which is more or less rectangular, is non-rotatably mounted to rotating knife flange 133. The cutting knife carrier covers about ten of the total of 16 exit openings thus, in the position shown, preventing passage through the outlet openings, which are not shown in FIG. 2. This ensures that respectively only a third of the number of exit openings is supplied with solid manure.

The cutting knife carrier is set into rotation by driving engine 140 so that constantly other exit openings are released and supplied with solid manure. The driving engine can be a hydraulic engine. Similarly, a driving engine can be connected by means of a power take-off. Similarly, the driving engine could be an electric engine. By way of the interaction of the cutting knife carrier with the exit openings and its rotation over the exit openings, the exit openings are supplied by way of pulsation with solid manure. Here, the solid manure can be fed into an interior of the rotating knife carrier and fed from this interior to the outlet openings. In this case, the distributor interior outside the cutting knife carrier is not supplied with solid manure. This part of the distributor interior can be ventilated so that air can be fed to the outlet openings which leads to blocks of manure and air intermittently flowing through the hose lines, and thus to an increased accuracy of distribution and flow uniformity. According to the invention, the solid manure can also be fed to the part of the distributor interior that is outside the knife carrier. In this case, the solid manure flows from the part of the distributor interior that is outside the knife rotor to the outlet openings. The interior of the knife carrier can also be ventilated to allow for incoming air, uniform distribution and continuous flow. For high application rates, the number of outlet openings that are covered by the interior of the knife carrier can be selected to be high, like in the first case, or to be low according to the second alternative. In an alternative embodiment, the part of the distributor interior that is both inside as well as outside of the knife carrier interior can be supplied with solid manure.

Cutting knife 135 is mounted to cutting knife carrier 134 on the side facing to cutting plate 120. The cutting knifes have cutting edges 135a,b that face to cutting plate 120 and rest on it. The rotation of the cutting knife carrier moves these cutting edges relative to the exit openings and have a shearing effect on the solids of the manure at the edges of the outlet openings. The constant rotation of the cutting knife edges in the distributor interior causes cutting of the solid parts of the manure in the area of the exit openings thus preventing blocking of the exit opening. The cutting of the solids further results in a good flowability of the solid manure through the connecting piece and the connected fluid carrying components thus effectively preventing blocking of the down-stream components.

The first embodiment shown serves to connect a first set of connecting lines to the first connecting piece thus inserting a deep manure storage into the soil layer. A second set of connecting lines is to be connected to the second connecting piece and inserts a high manure storage above into the soil layer. This high manure storage has a smaller volume than the deep manure storage.

FIGS. 3a-d show a second embodiment of a distributor according to the invention. The distributor is identical in design to the distributor according to the first embodiment according to FIGS. 2a-d and merely differs from the first embodiment in the design of the outlet openings and connecting pieces.

Contrary to the first embodiment, a first set of outlet openings 223a,b,c, a second set outlet openings 224a,b,c and a third set of outlet openings 225a,b,c in a cutting plate 220 are provided in the second embodiment. The first outlet openings have a first diameter and thus a first passage cross section size and are in fluid contact with a first set of connecting pieces 243a,b,c. The first connecting pieces have the same inner diameter as the first outlet openings and extend in the same manner as the connecting pieces of the first embodiment.

The second outlet openings 224a,b,c have a smaller diameter and thus a smaller passage cross section size as the first outlet openings. They are in fluid contact with a set of second connecting pieces 244a,b,c, which have the same inner diameter as the second outlet openings.

The third outlet openings 225a,b,c have the same diameter as the first exit openings 223a,b,c and have thus the same passage cross section size. The third outlet openings are in fluid contact with the third connecting pieces 245a,b,c which have the same inner diameter as the third outlet openings.

Respectively a first and a third exit opening are arranged adjacent to each other, in circumferential direction followed by a second exit opening so that a sequence of a first, second and third exit opening results respectively alternately on a circular path of cutting plate 220. The distance between the centers of the exit openings is the same so that the exit openings are distributed evenly across the circular path.

The second embodiment serves to establish a connection between the first and third connection lines and the first and third exit openings and connecting pieces so as to supply a low-lying discharge opening with solid manure in order to insert a larger and deep manure storage into the soil layer than with the first embodiment. The second exit openings are in turn connected to the second connecting lines via the second connecting pieces so as to supply a second discharge opening with solid manure to insert a smaller, high manure storage into the soil layer. The second embodiment can alternatively also be connected to the discharge openings in a way that the first and second exit openings are connected with a first, low-lying discharge opening and the third exit openings with a second discharge opening for spreading a high manure storage. In this case, the difference in volume between the low manure storage and the high manure storage is lower and equals merely the amount of manure that is additionally fed through the small second exit openings.

FIG. 4 (positions 343a,b,c are not included in the text) shows a third embodiment of a distributor apparatus according to the invention which, in regard to the embodiment of the distributor interior and the cutting plate as well as the exit openings arranged therein, corresponds to the first embodiment according to FIG. 2. The third embodiment, however, differs from the first embodiment in that connecting pieces 344a,b,c have a larger inner diameter than the second exit openings 324a,b,c and in particular an inner diameter that equals the inner diameter of the first connecting piece. By this, with this distributor apparatus, the first and second connecting lines can be inserted with a matching connecting diameter which simplifies assembly and possible alternative retrofit measures, since uniform tube dimensions can be used and the tubes can be exchanged in regard to their connecting point.

FIG. 5 shows a fourth embodiment of the distributor apparatus according to the invention which is designed in analogy to the second embodiment as the third to the first embodiment. In turn, the first, second and third outlet openings match the first, second and third outlet openings of the second embodiment, however differ from said second embodiment in their connection to connecting pieces 443a,b,c, 444a,b,c, 445a,b,c which have the same inner diameter, which matches the diameter of the first and third outlet opening. The advantages of the fourth embodiment are in particular that the connecting lines between the first, second and third connecting piece can be easily replaced, so that the volume supplied to the discharge openings through the respective variable connection of the connecting lines to the distributor apparatus can vary without the need to use new components.

What is claimed is:

1. An apparatus for inserting a solid manure storage into a soil layer, the apparatus comprising:
 a) an insertion apparatus with a set of first discharge openings and a set of second discharge openings that are vertically spaced from the set of first discharge openings,
 b) a distributor apparatus comprising a distributor interior, an intake opening leading into the distributor interior for supply of the solid manure, a first set of first exit openings to divert the solid manure from the distributor interior, and a second set of second exit openings to divert the solid manure from the distributor interior,
 c) a first set of first connecting lines, whereby each of the first connecting lines of the first set is connected at a first end to one of the first exit openings of the first set of first exit openings and at a second end to a first discharge opening from the set of first discharge openings, and
 d) a second set of second connecting lines, whereby each of the second connecting lines of the second set is connected at a first end to one of the second exit openings of the second set of second exit openings and at a second end to a second discharge opening from the set of second discharge openings,
 wherein a diameter of each of the first exit openings of the first set is larger than a diameter of each of the second exit openings of the second set.

2. Apparatus according to claim 1, further comprising a third set of third exit openings for discharging the solid manure from the distributor interior and comprising a third set of third connecting lines, whereby each of the third connecting lines of the third set is connected at a first end with one of the third exit openings of the third set and at a second end with a first discharge opening from the set of first discharge openings.

3. Apparatus according to claim 2, wherein a diameter of each of the third exit openings is the same as the diameter of either the first exit openings of the first set or the diameter of the second exit openings of the second set.

4. Apparatus according to claim 2, wherein the diameter of the first exit openings of the first set is different from the diameter of the third exit openings of the third set.

5. Apparatus according to claim 2, wherein the diameter of the first exit openings of the first set is the same as the diameter of the third exit openings of the third set.

6. Apparatus according to claim 1, wherein a cutting apparatus is positioned in the distributor interior which is flexible relative to the first exit openings of the first set and the second exit openings of the second set.

7. Apparatus according to claim 6, wherein the cutting apparatus has a cutting edge and is guided flexibly such that the cutting edge strokes across an edge of at least a number of the first openings of the first set or the second openings of the second set.

8. Apparatus according to claim 6, wherein the cutting apparatus strokes across an edge of all or some of the first openings of the first set or the second openings of the second set.

9. Apparatus according to claim 6, wherein the cutting apparatus has several cutting edges that each strokes across at least a number of the first openings of the first set or the second openings of the second set.

10. Apparatus according to claim 6, wherein the cutting apparatus can pivot around a rotation axis and is set into rotary or swinging motion by a drive mechanism.

11. Apparatus according to claim 1, wherein the first openings of the first set and the second openings of the second set are arranged in an even cutting plate.

12. An apparatus for inserting a solid manure storage into a soil layer, the apparatus comprising:
 a) an insertion apparatus with a set of first discharge openings and a set of second discharge openings that are vertically spaced from the set of first discharge openings,
 b) a distributor apparatus comprising a distributor interior, an intake opening leading into the distributor interior for supply of the solid manure, a first set of first exit openings to divert the solid manure from the distributor interior, and a second set of second exit openings to divert the solid manure from the distributor interior,
 c) a first set of first connecting lines, whereby each of the first connecting lines of the first set is connected at a first end to one of the first exit openings of the first set of first exit openings and at a second end to a first discharge opening from the set of first discharge openings,
 d) a second set of second connecting lines, whereby each of the second connecting lines of the second set is connected at a first end to one of the second exit openings of the second set of second exit openings and at a second end to a second discharge opening from the set of second discharge openings,
 wherein a passage cross section of a fluid carrying path extending from one of the first or second exit openings to a respective one of the first or second discharge openings does not decrease.

13. An apparatus for inserting a solid manure storage into a soil layer, the apparatus comprising:
 a) an insertion apparatus with a set of first discharge openings and a set of second discharge openings that are vertically spaced from the set of first discharge openings,
 b) a distributor apparatus comprising a distributor interior, an intake opening leading into the distributor interior for supply of the solid manure, a first set of first exit openings to divert the solid manure from the distributor interior, and a second set of second exit openings to divert the solid manure from the distributor interior,
 c) a first set of first connecting lines, whereby each of the first connecting lines of the first set is connected at a first end to a first exit opening of the first set of first exit openings and at a second end to a first discharge opening from the set of first discharge openings,
 d) a second set of second connecting lines, whereby each of the second connecting lines of the second set is connected at a first end to a second exit opening of the second set of second exit openings and at a second end to a second discharge opening from the set of second discharge openings,
 wherein the set of first discharge openings and the second set of discharge openings are arranged on a cultivator tine, wherein an interior of the cultivator tine is hollow and joins each of the second connecting lines of the second set and is in fluid contact with each of the second discharge openings of the set of second discharge openings.

14. Distributor for distributing solid manure over a plurality of discharge openings comprising:
 a distributor interior,
 an intake opening leading into the distributor interior for supply of the solid manure,
 a first set of first exit openings for diverting the solid manure from the distributor interior, and
 a second set of second exit openings for diverting the solid manure from the distributor interior,
 a) a first set of first connections, whereby each first connection of the first set of first connections is in fluid communication with one of the first exit openings of the first set and is designed for connection of a first connecting line,
 b) a second set of second connections, whereby each second connection of the second set of second connections is in fluid communication with one of the second exit openings of the second set and is designed for connection of a second connecting line,
 wherein a diameter of each of the first exit openings of the first set is larger than a diameter of each of the second exit openings of the second set.

15. A method for inserting solid manure into a soil layer comprising the following steps:
 a) inserting a plurality of first manure storages from a respective plurality of first discharge openings into a first layer that is proximate a surface of the soil layer,
 b) inserting a plurality of second manure storages from a respective plurality of second discharge openings into a second layer that is proximate the surface of the soil layer,
 c) feeding the solid manure to the plurality of first discharge openings via a plurality of first connecting lines, whereby each first connecting line of the plurality of first connecting lines is connected at a first end to a first outlet opening of a plurality of first outlet openings and at a second end to one of the plurality of first discharge openings,
 d) feeding the solid manure to the plurality of second discharge openings via a plurality of second connecting lines, whereby each second connecting line is connected at a first end to a second outlet opening of a plurality of second outlet openings and at a second end to one of the plurality of second discharge openings,
 e) feeding the solid manure to a distributor interior, and
 f) distributing the solid manure from the distributor interior over the plurality of first and second outlet openings, wherein a diameter of each of the first exit openings of the first set is larger than a diameter of each of the second exit openings of the second set.

\* \* \* \* \*

UNITED STATES PATENT AND TRADEMARK OFFICE
CERTIFICATE OF CORRECTION

PATENT NO. : 9,788,478 B2
APPLICATION NO. : 14/626517
DATED : October 17, 2017
INVENTOR(S) : Gerd-Felix Overmöhle Page 1 of 1

It is certified that error appears in the above-identified patent and that said Letters Patent is hereby corrected as shown below:

On the Title Page

In Item (30), under Foreign Application Priority Data, delete "20 2014 001 511 U" and insert --20 2014 001 511.2-- therefor.

Signed and Sealed this
Twentieth Day of February, 2018

Andrei Iancu
*Director of the United States Patent and Trademark Office*